G. H. AKERLUND.
HEATING AND VENTILATING SYSTEM FOR BUILDINGS.
APPLICATION FILED MAR. 2, 1917.

1,254,643.

Patented Jan. 29, 1918.
2 SHEETS—SHEET 2.

INVENTOR:
G. H. Akerlund,
BY his ATTORNEY:
A. M. Carlsen.

UNITED STATES PATENT OFFICE.

GUSTAF H. AKERLUND, OF BRAY, MINNESOTA.

HEATING AND VENTILATING SYSTEM FOR BUILDINGS.

1,254,643.

Specification of Letters Patent.   Patented Jan. 29, 1918.

Application filed March 2, 1917. Serial No. 151,954.

*To all whom it may concern:*

Be it known that I, GUSTAF H. AKERLUND, citizen of the United States, residing at Bray, in the county of Pennington and State of Minnesota, have invented a new and useful Heating and Ventilating System for Buildings, of which the following is a specification.

This invention relates to heating and ventilating systems and ventilators for residences, hotels, schools and other buildings which are heated from a furnace placed in the basement or lowest story of the building.

The object of the invention is to provide such buildings with a fuel saving heating system in which fresh air is circulated from the top of the building down to the furnace and after being there heated it is distributed through tubes to the various rooms of the building and circulated as foul air by other tubes from said rooms up through the top of the house, and to so arrange the fresh air tube that it is in contact with the smoke stack of the furnace and the foul air outlet tubes, so as to absorb some heat from them before reaching the heating chamber at the furnace, where it will then require less fuel to raise the temperature of the air to the standard required for the rooms.

Figure 1:
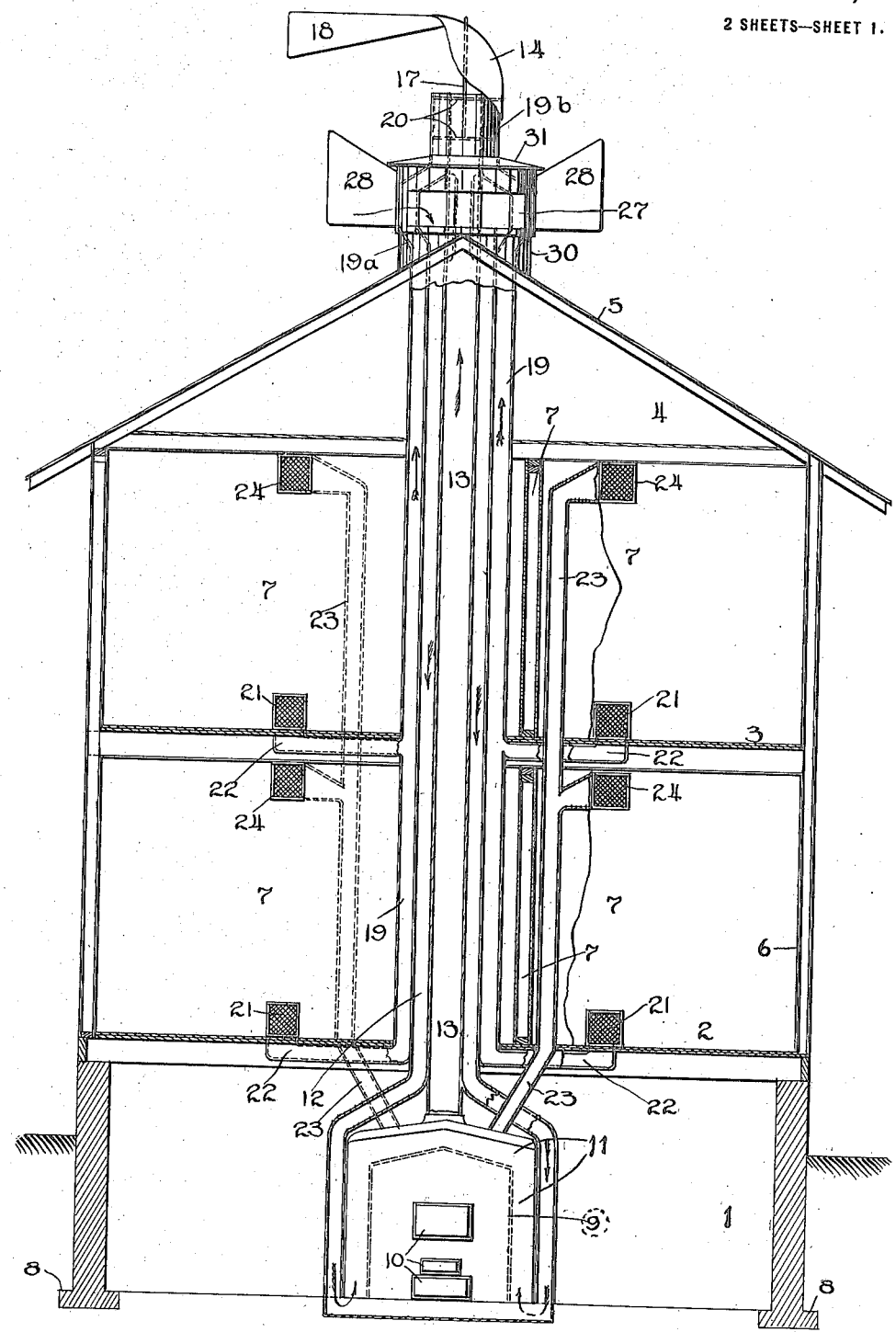
Figure 4:
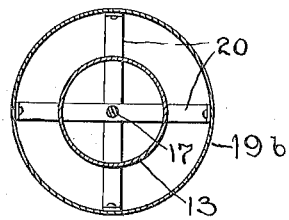
Figure 3:
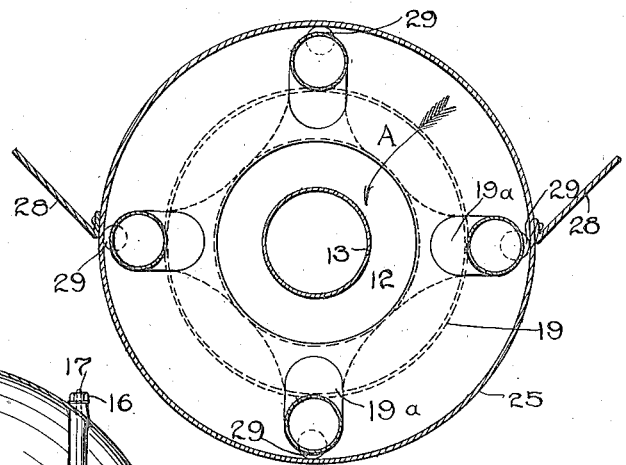
Figure 2:
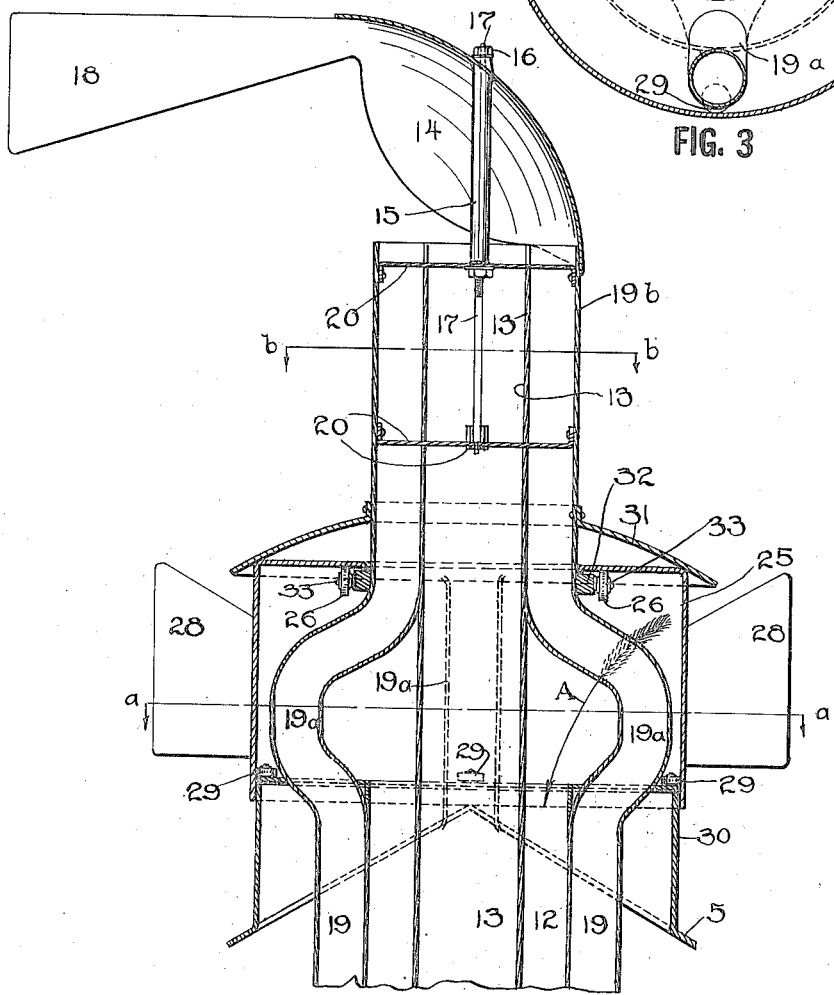

In the accompanying drawings: Figure 1 is a vertical section of a building equipped with my new heating and ventilating system. Fig. 2 is an enlarged diametrical vertical section of the ventilator or part of the system arranged in and above the roof of the building. Fig. 3 is a section on the line *a—a* in Fig. 2. Fig. 4 is a section on the line *b—b* in Fig. 2.

Referring to the drawings by reference numerals, 1 designates the basement, 2 the first story, 3 the second story, 4 the attic, 5 the roof, 6 the walls and 7 the partitions and 8 the foundation of a school house, or other building, having in its basement a furnace 9, whose doors 10 are exposed through the front wall of an air heating chamber 11, which is spaced about the furnace and receives cold or fresh air down through a large upright tube 12, while centrally up through said tube 12 the smoke stack 13 extends from the furnace to the required distance above the roof, where its top is provided with a hood 14, which has a sleeve 15, retained by a nut 16, upon a post 17 on which it is rotated by the action of the wind on a vane 18, so as to hold the hood 14 as a wind shield over the side of the top of the smoke-stack 13 and the foul air pipe 19, or 19ᵇ that are subjected to the force of the wind. Said post 17 is mounted in diametrically arranged bars 20 fixed in said tubes 13 and 19ᵇ (see Fig. 4).

Said foul air tube 19 is concentrically arranged about the cold air tube 12 and the latter likewise about the smoke-stack 13. Above the roof 5 the foul air tube is formed with outwardly arched branches 19ᵃ (best shown in Figs. 2 and 3), between which the fresh air is admitted into the tube 12, as indicated by arrows A in said figures. The upper legs of the arches 19ᵃ converge toward the smoke-stack and open into the reduced top portion 19ᵇ of the foul air tube. From registers 21 near the floor in each room the foul air passes upward from the air heating chamber 11, through tubes 23 and registers 24 in the upper part of each room.

To increase said air circulation by a forced downward draft in the fresh air tube, the upper part of the latter is provided with a cylindrical wind chamber 25 rotatable on rollers 26 and having in one side a large opening 27 (see Fig. 1) for the wind to blow into, and lateral wings 28 for the wind to act on and hold the opening against the wind. The lower end of the cylinder is guided by rollers 29 mounted upon a cylindrical base 30 fixed on the roof, and the upper end of the cylinder is protected from snow by a circular shield 31 fixed on the reduced portion 19ᵇ of the foul air tube, where is also fixed a collar 32, having studs 33 upon which the rollers 26 rotate.

What I claim is:

1. In a house heating and ventilating system, the combination with a fire apparatus, of a smoke stack therefrom up through the building and its roof, a fresh air tube spaced about the smoke stack and extending to a point between the roof and the top of the smoke-stack, a foul air tube spaced about the fresh air tube and having its upper part reduced in diameter above the top of the fresh air tube, and below said reduction formed into outwardly arched tubular branches between which the fresh air is to pass into the top of the fresh air tube.

2. In a house heating and ventilating system, the combination with a fire apparatus, of a smokestack therefrom up through the building and its roof, a fresh air tube spaced about the smoke-stack and extending to a point between the roof and the top of the smoke-stack, a foul air tube spaced about the fresh air tube and having its upper part reduced in diameter above the top of the fresh air tube, and below said reduction formed into outwardly arched tubular branches between which the fresh air is to pass into the top of the fresh air tube; a rotary hood mounted on the top of the smoke stack and the foul air tube and means for the wind to act on and turn said hood with its closed side to the wind, and a rotary wind chamber about the part of the foul air tube having spaces for the wind to enter the fresh air tube, said wind chamber having a front opening for the wind to enter and means for the wind to act on and hold the chamber with the opening against the wind, said means consisting of two lateral rearwardly diverging vanes one fixed at each side of the wind chamber.

In testimony whereof I affix my signature.

GUSTAF H. AKERLUND.